(12) United States Patent
Yoo et al.

(10) Patent No.: US 12,358,406 B2
(45) Date of Patent: Jul. 15, 2025

(54) SEAT OF VEHICLE

(71) Applicants: Hyundai Motor Company, Seoul (KR); Kia Corporation, Seoul (KR); Hyundai Transys Inc., Seosan-si (KR)

(72) Inventors: Han Su Yoo, Hwaseong-si (KR); Hyeong Jong Kim, Seoul (KR); Jung Sang You, Hwaseong-si (KR); Dong Woo Jeong, Gwacheon-si (KR); Byung Yong Choi, Hwaseong-si (KR); Jae Hoon Cho, Hwaseong-si (KR); Han Kyung Park, Hwaseong-si (KR); Hae Dong Kwak, Hwaseong-si (KR); Won Yeong Lee, Hwaseong-si (KR)

(73) Assignees: Hyundai Motor Company, Seoul (KR); Kia Corporation, Seoul (KR); Hyundai Transys Inc., Seosan-si (KR)

( * ) Notice: Subject to any disclaimer, the term of this patent is extended or adjusted under 35 U.S.C. 154(b) by 239 days.

(21) Appl. No.: 18/349,762

(22) Filed: Jul. 10, 2023

(65) Prior Publication Data
US 2024/0198874 A1    Jun. 20, 2024

(30) Foreign Application Priority Data
Dec. 15, 2022 (KR) .................. 10-2022-0176029

(51) Int. Cl.
*B60N 2/60* (2006.01)
*G06F 3/16* (2006.01)
(Continued)

(52) U.S. Cl.
CPC ......... *B60N 2/6027* (2013.01); *B60N 2/6063* (2013.01); *G06F 3/16* (2013.01);
(Continued)

(58) Field of Classification Search
CPC ..... A47C 31/02; A47C 31/023; A47C 31/026; A47C 31/04; A47C 31/06; B60N 2/7035;
(Continued)

(56) References Cited

U.S. PATENT DOCUMENTS 1,716,176 A * 6/1929 Vitez-Keresztfalvy ............
A47C 31/04
5/191
2,028,493 A * 1/1936 Bernstein ............... A47C 31/04
267/112
(Continued)

FOREIGN PATENT DOCUMENTS

KR    10-2021-0152288    12/2021

*Primary Examiner* — Syed A Islam
(74) *Attorney, Agent, or Firm* — Fish & Richardson P.C.

(57) ABSTRACT

A seat of a vehicle includes a foam pad in which a first hook part is installed and configured to slide on a rear surface opposite to a seating surface; a covering in which a wire is provided at an end portion and surrounds the seating surface of the foam pad to be caught and fixed to the first hook part of the rear surface of the foam pad; and a plate coupled to the rear surface of the foam pad and configured to slide the first hook part according to movement, wherein, when the covering and the foam pad are coupled, the hook part slides, and the wire is pulled by the first hook part so that the covering is fixed in a state of surrounding the foam pad.

14 Claims, 7 Drawing Sheets

(51) Int. Cl.
  *G06T 7/73*    (2017.01)
  *A47C 31/02*   (2006.01)
  *B60N 2/58*    (2006.01)
  *B60N 2/70*    (2006.01)

(52) U.S. Cl.
  CPC ............... *G06T 7/73* (2017.01); *A47C 31/02* (2013.01); *B60N 2/5825* (2013.01); *B60N 2/5858* (2013.01); *B60N 2/7035* (2013.01); *G06T 2207/30201* (2013.01)

(58) Field of Classification Search
  CPC .. B60N 2/7041; B60N 2/7347; B60N 2/5825; B60N 2/5858; B60N 2/5816; B60N 2/6027; B60N 2/6063
  See application file for complete search history.

(56) References Cited

U.S. PATENT DOCUMENTS

| | | | | |
|---|---|---|---|---|
| 6,786,547 | B1* | 9/2004 | Chu | B60N 2/879 |
| | | | | 297/217.3 |
| 9,199,564 | B2* | 12/2015 | Clauser | B60N 2/68 |
| 9,302,602 | B2* | 4/2016 | Yoshida | B60N 2/5825 |
| 9,809,138 | B2* | 11/2017 | Fuwa | B60N 2/6009 |
| 9,914,379 | B2* | 3/2018 | Ushiyama | B60N 2/6027 |
| 2014/0084660 | A1* | 3/2014 | Norman | A47C 1/0305 |
| | | | | 297/452.1 |

\* cited by examiner

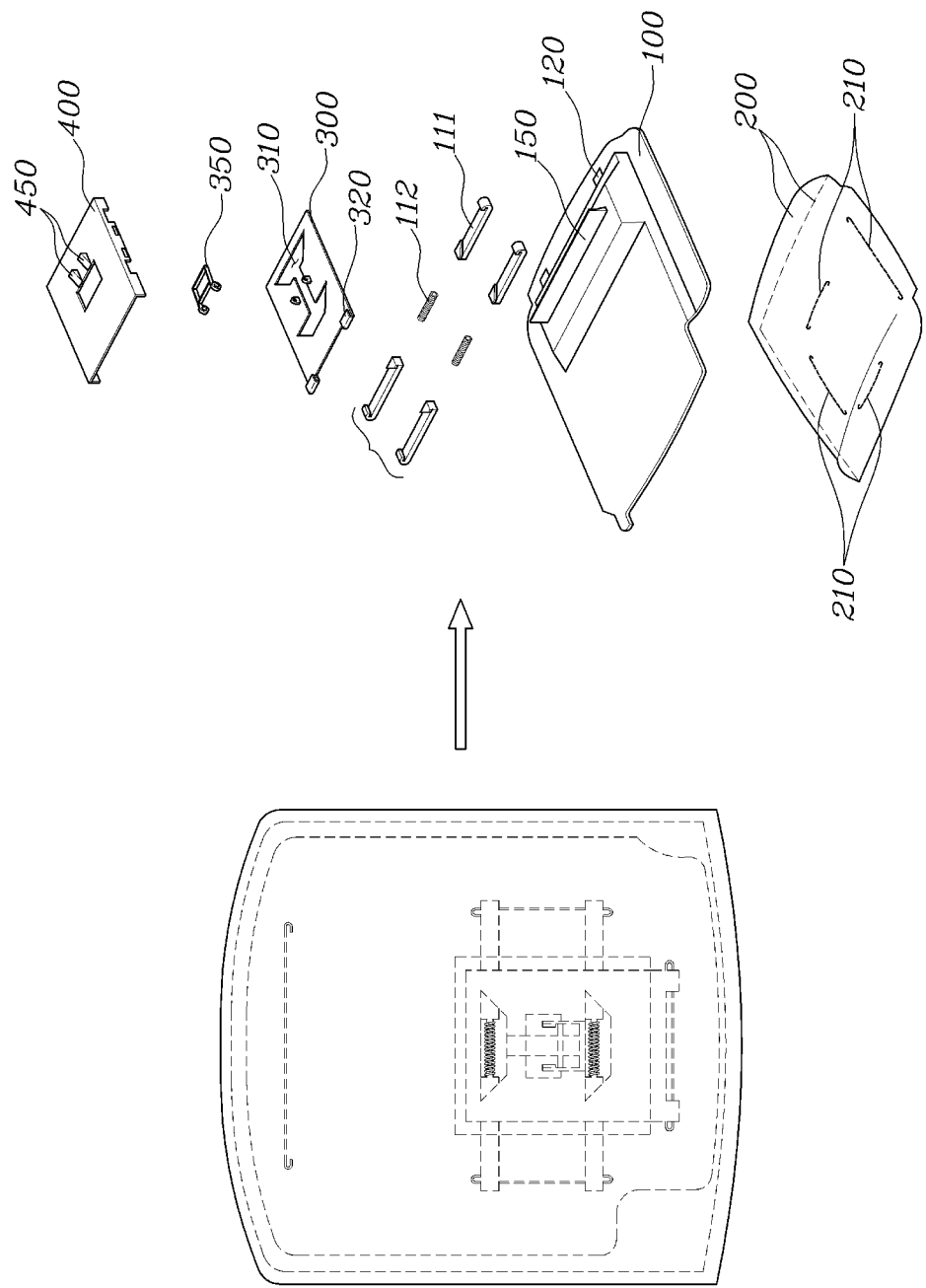

[FIG. 2]
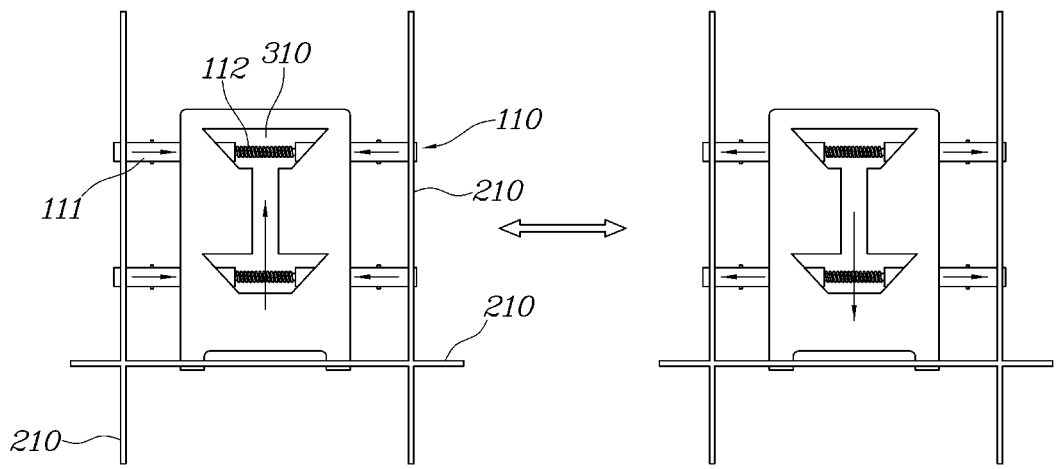

[FIG. 3]
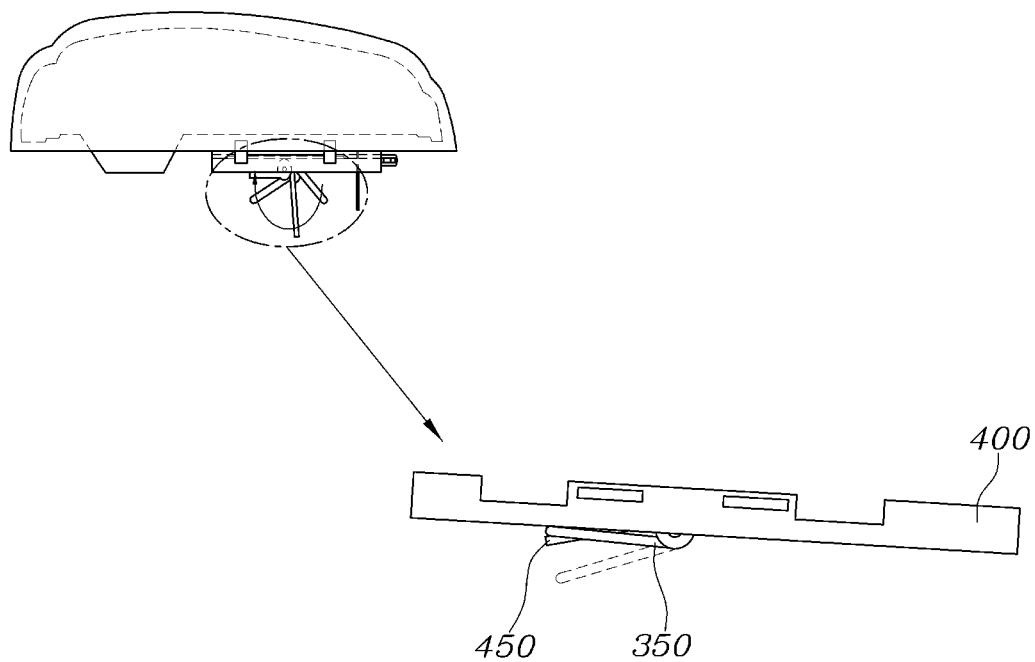

[FIG. 4]
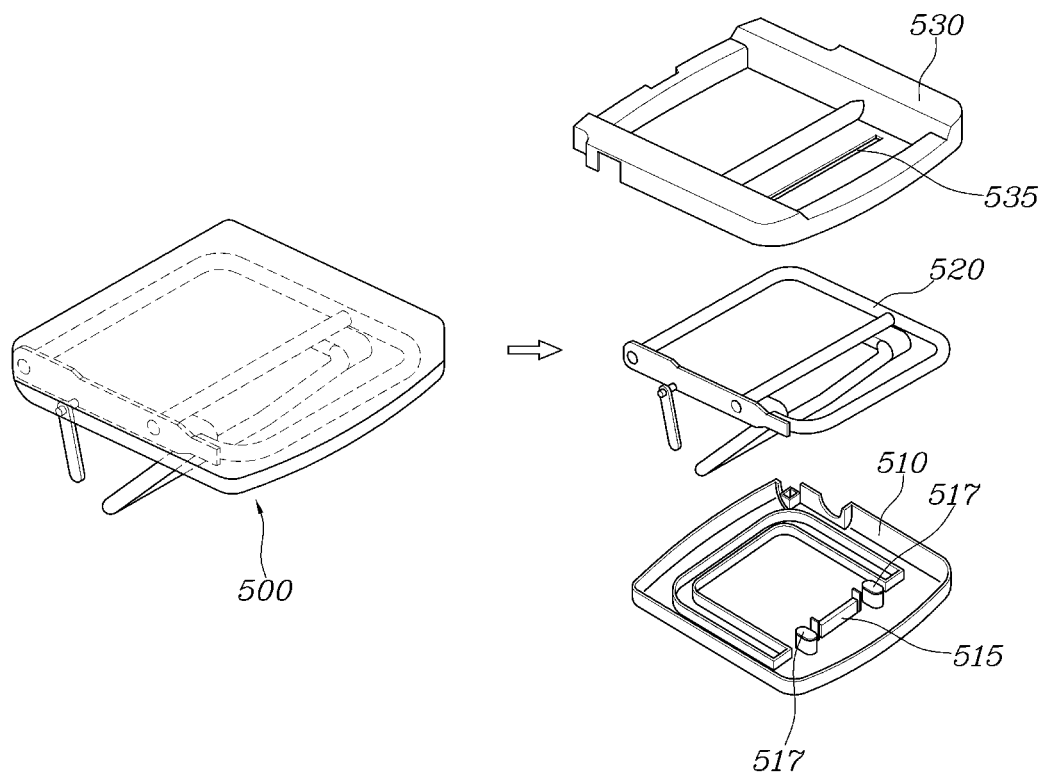

[FIG. 5]
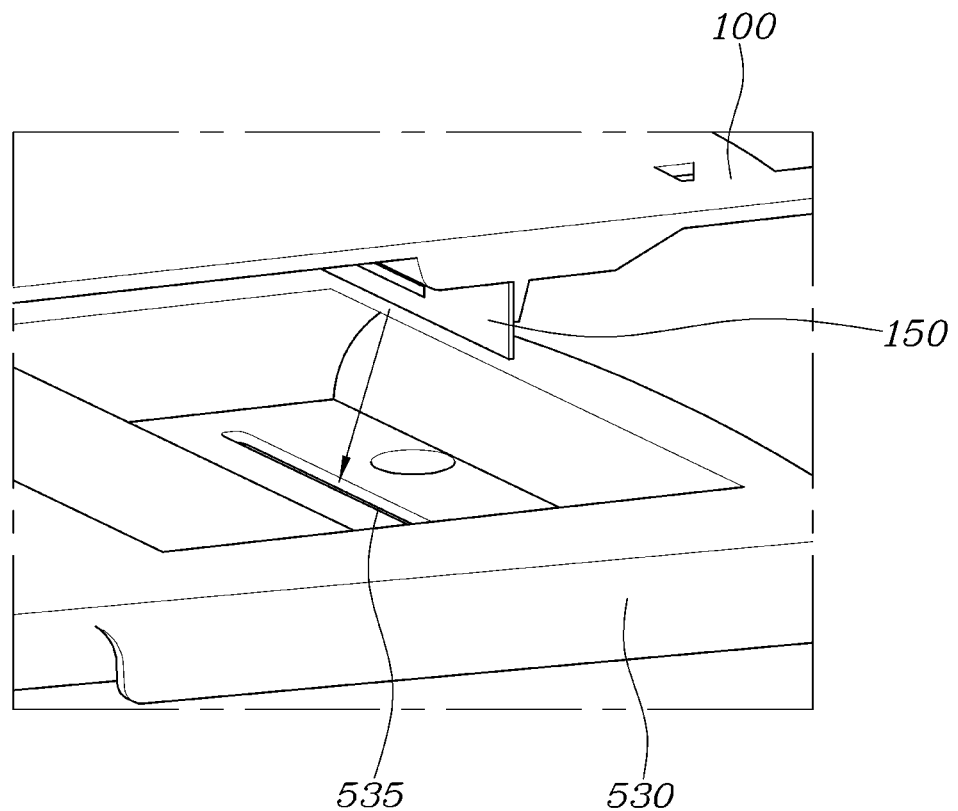

[FIG. 6]
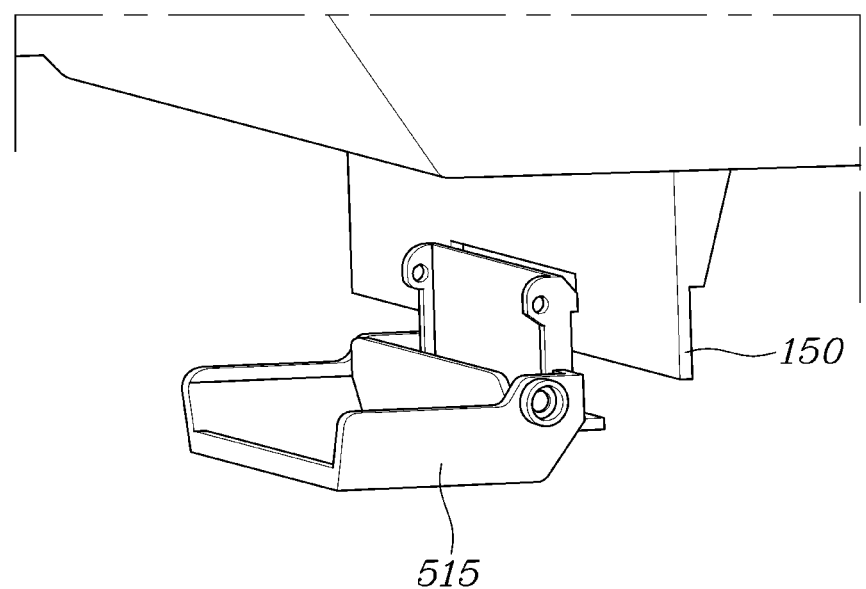

[FIG. 7]
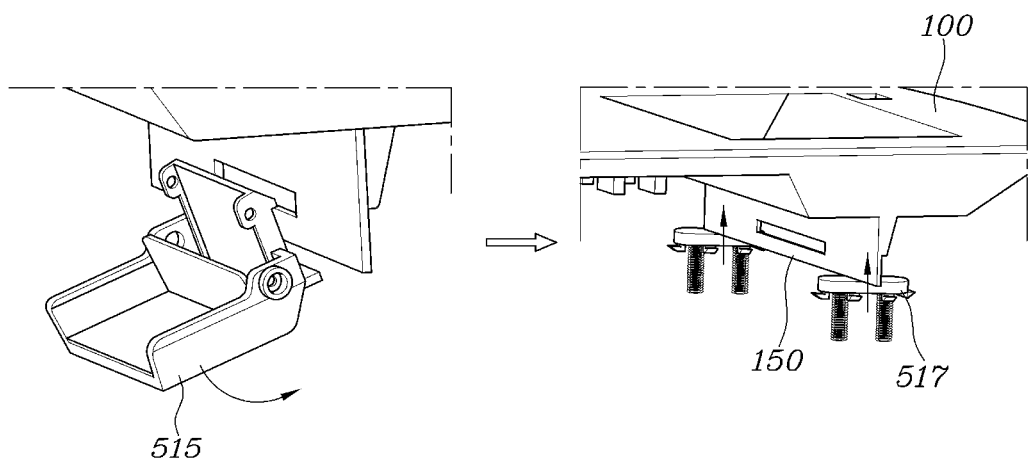

SEAT OF VEHICLE

CROSS REFERENCE TO RELATED APPLICATION

The present application claims priority of Korean Patent Application No. 10-2022-0176029 filed on Dec. 15, 2022, the entire contents of which is incorporated herein for all purposes by this reference.

TECHNICAL FIELD

The present disclosure relates to a seat of a vehicle, and more particularly, to replacing a seat covering of the seat of the vehicle.

BACKGROUND

A seat of a vehicle provides a space for a passenger to take a rest or perform a necessary task while the passenger is seated to move to a destination.

With the recent development of an autonomous driving technology and unmanned vehicles without drivers according to the development of a purpose-built vehicle (PBV) technology, it is expected that an unspecified number of passengers sits on seats, and contamination of seat coverings increases due to an increase in the frequency of use.

A conventional seat covering is fixed to a lower end of the seat so that it not easy to replace the seat covering without involving of a specialized company, and, when the seat covering itself is fixed to the seat, there is a problem in that removal of the seat covering is impossible.

Accordingly, even when the seat covering is contaminated, it is impossible to wash or replace the seat covering itself such that a sanitary problem resulting from rust on a seat frame or resulting from propagation of fungi due to an inflow of food into the seat covering was unavoidable.

SUMMARY

Accordingly, the present disclosure is directed to a seat of a vehicle, in which a seat covering constituting a seat can be easily replaced, and furthermore, a foam pad to which the seat covering is coupled can be replaced so that, when contaminated, the seat covering can be separated and washed or can be replaced itself.

According to one aspect, there is provided a seat of a vehicle, which includes a foam pad in which a hook part is installed and configured to slide on a rear surface opposite to a seating surface; a covering in which a wire is provided at an end portion and surrounds the seating surface of the foam pad to be caught and fixed to a hook part of the rear surface of the foam pad; and a plate coupled to the rear surface of the foam pad and configured to slide the hook part according to movement, wherein, when the covering and the foam pad are coupled, the hook part slides, and the wire is pulled by the hook part so that the covering is fixed to the foam pad in a state of surrounding the foam pad.

The hook part may slide on the plate based on the center of the plate.

A guide space configured to guide the sliding of the hook part may be formed in the plate.

The guide space may be formed in a parallelogram shape.

A plate cover configured to fix a position of the plate may be provided at the foam pad, and a plate fixing part configured to fix the position of the plate may be provided at the plate, wherein the plate fixing part may be caught to a locking protrusion provided on the plate cover so that the position of the plate may be fixed.

A first hook part may be installed to slide on the rear surface of the foam pad, and a second hook part configured to fix the covering by pulling the wire of the covering may be installed on the plate.

Directions in which the first hook part and second hook part pull the wire may be different from each other.

A third hook part to which the wire of the covering is caught and fixed may be provided on the rear surface of the foam pad.

The first hook part may include a plurality of hooks configured to pull the wire of the covering, and a spring connected between the plurality of hooks and configured to push the hook in an opposite direction.

The spring may be connected between the hooks facing each other.

The seat may further include a seat frame configured to detach the foam pad by a pivoting of a lever, the lever configured to fix the foam pad to the seat frame may be coupled to the rear surface of the foam pad, and when the lever is locked, the foam pad may be fixed to the seat frame.

A lever engaging protrusion may be formed to protrude downward and extend from the rear surface of the foam pad, and a lever engaging protrusion through groove through which the lever engaging protrusion passes may be formed at the seat frame, wherein, after the lever engaging protrusion passes through the lever engaging protrusion through groove, the lever may be coupled to the lever engaging protrusion.

An elastic part may be installed on the seat frame to push the lever engaging protrusion upward when the lever engaging protrusion passes through the lever engaging protrusion through groove, and when the lever is opened, the elastic part may push the lever engaging protrusion upward to detach the foam pad from the seat frame.

The covering may be fixed to the foam pad first, and then the foam pad may be attached to the seat frame.

BRIEF DESCRIPTION OF THE DRAWINGS

FIG. 1 is an exploded view illustrating an example of a seat of a vehicle.

FIG. 2 is a diagram illustrating an example of a sliding of a first hook part.

FIG. 3 is a diagram illustrating an example of a fixing process of a plate.

FIG. 4 is an exploded view illustrating an example of a seat frame.

FIGS. 5 and 6 are diagrams illustrating that a foam pad is assembled to the seat frame.

FIG. 7 is a diagram illustrating an example of a process of detaching the foam pad from the seat frame.

DETAILED DESCRIPTION

A seat of a vehicle can include a foam pad 100 in which a hook part 110' is installed to slide on a rear surface opposite to a seating surface of the foam pad 100, a covering 200 including a wire 210 provided at an end portion of the covering 200 and configured to surround the seating surface of the foam pad 100 and configured to be caught and fixed to the hook part 110' on the rear surface of the foam pad 100, and a plate 300 coupled to the rear surface of the foam pad 100 and configured to slide the hook part 110' according to movement and when the hook part 110' slides, the wire 210 is pulled by the hook part 110' so that the covering 200 may be fixed in a state of surrounding the foam pad 100.

FIG. 1 is an exploded view illustrating a seat of a vehicle. Referring to FIG. 1, a seat cushion on which a passenger is seated is injected at a front side of the foam pad 100. For a seating feeling, a urethane foam material in which polyol, isocyanate, and a foaming agent are mixed may be used for the seat cushion.

In order to inject the seat cushion on an upper surface of the foam pad 100, the foam pad 100 is inserted into a mold, and urethane foam is injected on the upper surface of the foam pad (100) so that the seat cushion may be injected. When the injection of the seat cushion is completed, the covering 200 is put on an upper surface of the seat cushion.

The covering 200 surrounds the seat cushion, and various materials such as natural leather, synthetic leather, and a fabric may be applied to the covering 200.

The hook part 110' for fixing the covering 200 put on the upper surface of the seat cushion is installed on the rear surface of the foam pad 100. In some implementations, the hook part 110' may include a first hook part 110 to a third hook part 120 and, in some cases, the first hook part 110 to the third hook part 120 may be installed at the same position or different positions.

In some implementations, the wire 210 provided inside the covering 200 is coupled to the first hook part 110, the first hook part 110 may slide to pull the wire 210 provided inside the covering 200 to fix the covering 200 in a state in which the covering 200 is unfolded.

The plate 300 slides the first hook part 110 and may be vertically moved to slide the first hook part 110 in a left-right direction.

That is, referring to FIG. 2, the first hook part 110 slides by the movement of the plate in the left-right direction. When the plate 300 is moved upward, the first hook part 110 slides in a direction of the center of the plate 300 so that the covering 200 is unfolded.

Conversely, when the plate 300 is moved downward, the first hook part 110 slides in an outward direction of the plate 300 so that the covering 200 is loosened.

Through the above process, the seat covering 200 of the vehicles may be separated from the foam pad 100. Accordingly, when the covering 200 is contaminated or physical damage occurs in the covering 200, the covering 200 may be replaced.

Meanwhile, the first hook part 110 may slide on the plate 300 based on the center of the plate 300. As shown in FIG. 2, the wire 210 of the covering 200 is coupled to the first hook part 110, and as the wire 210 is pulled or loosened due to the sliding of the first hook part 110, the covering 200 may be fixed or released.

Specifically, a guide space 310 for guiding sliding of the first hook part 110 may be formed in the plate 300. As one example, the guide space 310 for guiding sliding of the first hook part 110 may be formed in the form of a parallelogram.

That is, in order to guide the sliding of the first hook part 110, the guide space 310 may be formed in the form of a parallelogram having a long upper side and a short lower side.

In this case, due to the movement of the plate 300, the first hook part 110 may slide in the central direction and the outward direction based on the center of the plate 300.

Meanwhile, the first hook part 110 may include a spring 112 connected between a plurality of hooks 111 pulling the wire 210 of the covering 200 and configured to push the hook 111 in an opposite direction.

Referring to FIGS. 1 and 2, the first hook part 110 includes a pair of hooks 111 facing each other and the spring 112 positioned between the pair of hooks 111 and configured to connect the pair of hooks 111.

When the plate 300 is moved downward, the hook 111 slides toward the center of the plate 300 along a lateral side of the guide space 310. Conversely, when the plate 300 is moved upward, the hook 111 slides toward the outside of the plate 300 along the lateral side of the guide space 310 due to an elastic force of the spring 112.

In the drawings, although it has been shown that the plate 300 has four hooks 111 and two guide spaces 310 as an example, the plate 300 may be designed to have two hooks 111 and one guide space 310 and to have more hooks 111 and more guide spaces 310.

Meanwhile, a plate cover 400 for fixing a position of the plate 300 is provided in the foam pad 100, a plate fixing part 350 for fixing the position of the plate 300 is provided in the plate 300, and thus the plate fixing part 350 is caught to a locking protrusion 450 provided on the plate cover 400 so that the position of plate 300 may be fixed.

Specifically, referring to FIGS. 1 and 3, the plate 300 is coupled to the foam pad 100, and then the plate cover 400 is coupled to the foam pad 100 on an upper portion of the plate 300.

The plate 300 is provided with the plate fixing part 350 for fixing a movement position of the plate 300, and when coupled to the plate cover 400, the plate fixing part 350 may fix the position of the plate 300 by being caught and fixed to the locking protrusion 450 provided on the plate cover 400.

That is, as shown in FIGS. 2 and 3, after the covering 200 is coupled to the foam pad 100 and the plate 300 is moved upward to fix the covering 200 to the foam pad 100, in order to prevent the plate 300 from returning to its original position by the spring 112 of the first hook part 110, the plate fixing part 350 is caught to the locking protrusion 450 of the plate cover 400 so that the plate 300 may be fixed.

Meanwhile, the plate 300 may include a second hook part 320 for fixing the covering 200 by pulling the wire 210 of the covering 200.

Referring to FIGS. 1 to 3, the second hook part 320 is coupled to the wire 210 of the covering 200 and pulls the wire 210 according to the sliding of the plate 300 to fix the covering 200.

That is, as shown in FIG. 2, when the plate 300 is moved upward, the wire 210 coupled to the first hook part 110 is pulled in the central direction of the plate 300 so that the covering 200 may be fixed.

Furthermore, when the plate 300 is moved upward, the wire 210 coupled to the second hook part 320 is also pulled in the central direction of the plate 300 so that the covering 200 may be fixed.

In this case, the directions in which the first hook part 110 and the second hook part 320 pull the wires 210 may be different from each other, and since the seat cushion is generally injected in a quadrangular shape, the wires 210 inside the covering 200 are provided to be orthogonal or parallel to each other.

Accordingly, the directions in which the first hook part 110 and the second hook part 320 pull the wires 210 may be orthogonal to each other.

Meanwhile, the third hook part 120 to which the wire 210 of the covering 200 is caught and fixed may be provided on the rear surface of the foam pad 100.

The third hook part 120 may be provided on the rear surface of the foam pad 100 and serve as the basis to which the wire 210 of the covering 200 is coupled first.

That is, the wire 210 coupled to the third hook part 120 is not pulled, and the remaining wires 210 coupled to the first hook part 110 and the second hook part 320 are pulled so that the covering 200 may be fixed.

Meanwhile, the seat of a vehicle further includes a seat frame 500 to which the foam pad 100 is detachable by pivoting of a lever 515, the lever 515 for fixing the foam pad 100 to the seat frame 500 is coupled to the rear surface of the foam pad 100, and when the lever 515 is locked, the foam pad 100 may be fixed to the seat frame 500.

Specifically, referring to FIG. 4, the seat frame 500 is assembled with the foam pad 100 to which the covering 200 is coupled. Although only some components for describing the present disclosure have been shown in FIG. 4, the seat frame 500 may be fixed to a floor cross member of a vehicle, and a frame constituting a seatback may also be included.

The seat frame 500 includes a cushion frame 520 serving as a framework, an upper cover 530 coupled to an upper end of the cushion frame 520, and a lower cover 510 coupled to a lower end of the cushion frame 520.

The lever 515 is provided at the lower cover 510 to allow the foam pad 100 to be detachable by pivoting of the lever 515. Specifically, referring to FIG. 5, when the seat frame 500 of the foam pad 100 is assembled, the lever 515 provided at the lower cover 510 is coupled to the foam pad 100.

That is, a lever engaging protrusion 150 protruding downward and extending is formed on the rear surface of the foam pad 100, a lever engaging protrusion through groove 535 through which the lever engaging protrusion 150 passes is formed on the upper cover 530 of the seat frame 500, and after the lever engaging protrusion 150 passes through the lever engaging protrusion through groove 535, the lever 515 may be coupled to the lever engaging protrusion 150.

That is, as shown in FIGS. 5 and 6, the lever 515 may be coupled to the lever engaging protrusion 150 of the foam pad 100. In some implementations, the lever 515 protrudes downward from the lower cover of the seat frame, and when the lever engaging protrusion of the foam pad 100 is coupled to the lever 515, the lever 515 may be pivoted to fix the foam pad 100.

Meanwhile, an elastic part 517 configured to push the lever engaging protrusion 150 upward when the lever engaging protrusion 150 passes through is installed at the lower cover 510 of the seat frame 500, and when the lever 515 is opened, the elastic part 517 may push the lever engaging protrusion 150 upward to detach the foam pad 100 from the seat frame 500.

Specifically, referring to FIGS. 4 and 7, when the foam pad 100 is coupled, a portion of the lever engaging protrusion 150 comes into contact with the elastic part 517. In this case, when the lever 515 is pivoted in a locking direction, the elastic part 517 is maintained in a compressed state, and the foam pad 100 is fixed to the seat frame 500.

Conversely, as shown in FIG. 7, when the lever 515 is pivoted in an opening direction, the lever engaging protrusion 150 is pushed upward due to an elastic force of the elastic part 517.

Accordingly, the foam pad 100 may be detachable from the seat frame 500.

According to the present disclosure, when replacement of the seat covering 200 of the vehicle is required, the seat covering 200 may be easily replaced by separating the foam pad 100 from the seat frame 500, and even when elasticity of the seat cushion of the foam pad 100 is degraded, the foam pad 100 itself may be replaced. Both in the case of replacing only the covering 200 and in the case of replacing the foam pad 100 itself, the covering 200 is fixed to the foam pad 100 first, and then the foam pad 100 may be attached to the seat frame 500.

In accordance with a seat of a vehicle of the present disclosure, a covering constituting the seat can be easily replaced, and furthermore, a foam pad to which the covering is coupled can be replaced so that, when the covering is contaminated, the covering can be separated and cleaned or the covering itself can be replaced.

What is claimed is:

1. A seat of a vehicle, comprising:
   a foam pad having a seating surface and configured to receive a hook part at a rear surface opposite to the seating surface, the hook part being configured to move on the rear surface;
   a covering providing a wire at an end portion, the wire surrounding the seating surface of the foam pad to be coupled to the hook part; and
   a plate coupled to the rear surface of the foam pad and configured to move the hook part,
   wherein the hook part is configured to, based on the hook part being moved, pull the wire to thereby couple the covering to the foam pad in a state of surrounding the foam pad.

2. The seat of claim 1, wherein the hook part is configured to move on the plate with respect to a center of the plate.

3. The seat of claim 1, wherein the plate defines a guide space configured to guide the hook part.

4. The seat of claim 3, wherein the guide space is provided in a parallelogram shape.

5. The seat of claim 1, wherein:
   the foam pad provides a plate cover,
   the plate provides a plate fixing part, and
   the plate cover provides a locking protrusion configured to receive the plate fixing part to thereby fix a position of the plate.

6. The seat of claim 1, wherein the hook part includes (a) a first hook part configured to move on the rear surface of the foam pad and (ii) a second hook part provided at the plate and configured pull the wire of the covering.

7. The seat of claim 6, wherein directions in which the first hook part and the second hook part pull the wire are different from each other.

8. The seat of claim 1, wherein the hook part includes a third hook part provided at the rear surface of the foam pad and configured to receive the wire of the covering.

9. The seat of claim 1, wherein the hook part includes:
   a plurality of hooks configured to pull the wire of the covering in a first direction, and
   a spring connected between the plurality of hooks and configured to push the hook in a second direction opposite to the first direction.

10. The seat of claim 9, wherein the spring is connected between hooks facing each other among the plurality of hooks.

11. The seat of claim 1, further comprising:
    a seat frame configured to, based on pivoting of a lever, detach the foam pad,
    wherein the lever is (is) configured to couple the foam pad to the seat frame and (ii) coupled to the rear surface of the foam pad, and
    wherein the lever is configured to, based on the lever being locked, fix the foam pad to the seat frame.

12. The seat of claim 11, wherein:
    the foam pad provides a lever engaging protrusion protruding downward and extending from the rear surface of the foam pad, the seat frame provides a lever engaging protrusion through groove through which the lever engaging protrusion passes, and the lever is configured to, based on the lever engaging protrusion being passed through the lever engaging protrusion through groove, be coupled to the lever engaging protrusion.

13. The seat of claim 12, wherein the seat frame is configured to receive an elastic part that is configured to:

based on the lever engaging protrusion being passed through the lever engaging protrusion through groove, push the lever engaging protrusion upward, and based on the lever being opened, push the lever engaging protrusion upward to detach the foam pad from the seat frame.

14. The seat of claim 11, wherein the covering is coupled to the foam pad, and the foam pad is attached to the seat frame after the covering is coupled to the foam pad.

\* \* \* \* \*